United States Patent [19]

Hoehn

[11] Patent Number: 5,419,531
[45] Date of Patent: May 30, 1995

[54] VALVE ASSEMBLY STRUCTURE FOR A FLUID SYSTEM

[75] Inventor: William E. Hoehn, St. Louis County, Mo.

[73] Assignee: Emerson Electric Co., St. Louis, Mo.

[21] Appl. No.: 293,088

[22] Filed: Aug. 18, 1994

Related U.S. Application Data

[63] Continuation of Ser. No. 125,865, Sep. 27, 1993, abandoned.

[51] Int. Cl.⁶ ............................................. F16K 47/16
[52] U.S. Cl. ............................... 251/122; 251/129.11; 251/903
[58] Field of Search .................... 251/122, 129.11, 357, 251/903

[56] References Cited

U.S. PATENT DOCUMENTS

| | | | |
|---|---|---|---|
| 1,968,779 | 7/1934 | Johnsen | 251/122 X |
| 2,346,938 | 4/1944 | Oravec | 251/357 X |
| 2,770,443 | 11/1956 | Rand | 251/357 X |
| 3,262,673 | 7/1966 | Seeley | 251/357 |
| 4,313,594 | 2/1982 | Antoniw et al. | 251/357 |
| 4,376,333 | 3/1983 | Kanamaru et al. | 403/282 X |
| 4,986,085 | 1/1991 | Tischer | 62/225 |
| 5,052,656 | 10/1991 | Katayama | 251/129.11 |
| 5,120,018 | 6/1992 | Lamb | 251/129.15 |

*Primary Examiner*—William E. Tapolcai
*Attorney, Agent, or Firm*—Polster, Lieder, Woodruff & Lucchesi

[57] ABSTRACT

A valve assembly structure including a valve body having a fluid passage therein to allow fluid to flow from one end port opening to an opposite end port opening, the valve body including an annular sealing surface cooperative with at least one of the end port openings with a valve stem cooperatively aligned with such end port opening to open and close the same, the valve stem having a collar restrainedly fastened to such valve stem to present an annular collar sealing surface facingly cooperative with the annular sealing surface on the valve body to fluid seal the end port opening when the valve stem is moved to a closed position.

13 Claims, 3 Drawing Sheets

VALVE ASSEMBLY STRUCTURE FOR A FLUID SYSTEM

This is a continuation of application Ser. No. 08/125,865 filed on Sep. 27, 1993, now abandoned.

BACKGROUND OF THE INVENTION

The present invention relates to a unique valve assembly structure and more particularly to a valve assembly structure for electrically actuated expansion valves for refrigeration systems in which there is constant incremental flow rate control.

Electrically actuated expansion valves for controlling fluid flow in refrigerant systems are generally well known in the refrigeration art, attention being directed to tho motor actuated expansion valve disclosed in U.S. Pat. No. 4,986,085, issued to James C. Tischer on Jan. 22, 1991 and to the solenoid actuated expansion valve disclosed in U.S. Pat. No. 5,120,018, issued to John D. Lamb on Jun. 9, 1992. These and other past fluid control valves, particularly those employed as expansion valves in fluid refrigeration systems, have presented flow control problems involving comparatively high friction seating with accompanying stem sticking, undesirable energy utilization, and frequent wear and replacement. Furthermore, inaccurate shut-off due to valve stem sticking, and high friction wear, as well as limited usage over large temperature ranges, have led to undesirable fluid leakages in many of the previous refrigerant systems with undesirable damages to other parts in the refrigerant systems—often necessitating frequent and costly parts replacement.

The present invention recognizing the limitations of past valve assembly structures, provides a unique valve assembly structure which, although it has novel features readily usable with valve stems in a number of fluid control environments, is particularly usable with expansion valves for bi-flow heat pumps. The straightforward and economical valve structure of the present invention minimizes fluid leakage, reduces energy consuming torque and other energy requirements by providing low friction contact valve seating with minimal valve seat wear. At the same time, the novel structure of the present invention assures full closure of the valve stem with an optimum sealing surface and without undesirable valve sticking. The present invention further provides valve stem operation over a broad temperature range with minimal expansion—contraction and without undesirable longitudinal movement or rotation of the unique, straightforward, yet critical valve stem parts included in the unique valve structure assembly.

Various other features of the present invention will become obvious to one skilled in the art upon reading the disclosure set forth herein.

BRIEF SUMMARY OF THE INVENTION

More particularly the present invention provides a valve assembly valve structure for a fluid stream comprising: a valve body including a flow-through fluid passage extending therein to allow a fluid stream to flow from one end port opening of the passage to the other end port opening of the passage, at least one end port opening having an annular sealing surface in the valve body cooperative with such end port opening to extend in a spaced plane surrounding the fluid passage adjacent such end port opening; a longitudinally extending, lineal movable, valve stem cooperatively mounted in the valve body, such valve stem having one end portion thereof geometrically sized and configured to movably cooperate with the annular sealing surface and the cooperative end port opening in the valve body to control passage of fluid through such end port opening; and, an annular collar member surroundingly engaging with the periphery of the valve stem in selected spaced relation from the extremity of the end portion of the valve stem adapted to cooperate with such end port opening to control fluid flow therethrough, the collar member including an annular sealing surface at one end extremity thereof adapted to engage in facing sealing relation with the annular sealing surface in the valve body cooperative with the end port opening upon lineal movement of the valve stem to a preselected control position. In addition the present invention provides valve structure wherein there is minimal, effective, sealing contact between engaging, facing sealing surfaces, this minimal contact serving to reduce energy consuming frictional contact.

It is to be understood that various changes can be made by one skilled in the art in one or more of the several parts of the inventive valve structure disclosed herein without departing from the scope or spirit of the present invention.

BRIEF DESCRIPTION OF THE DRAWINGS

Referring to the drawings which disclose one advantageous embodiment of the present invention.

DETAILED DESCRIPTION OF THE DRAWINGS

Figure 1:
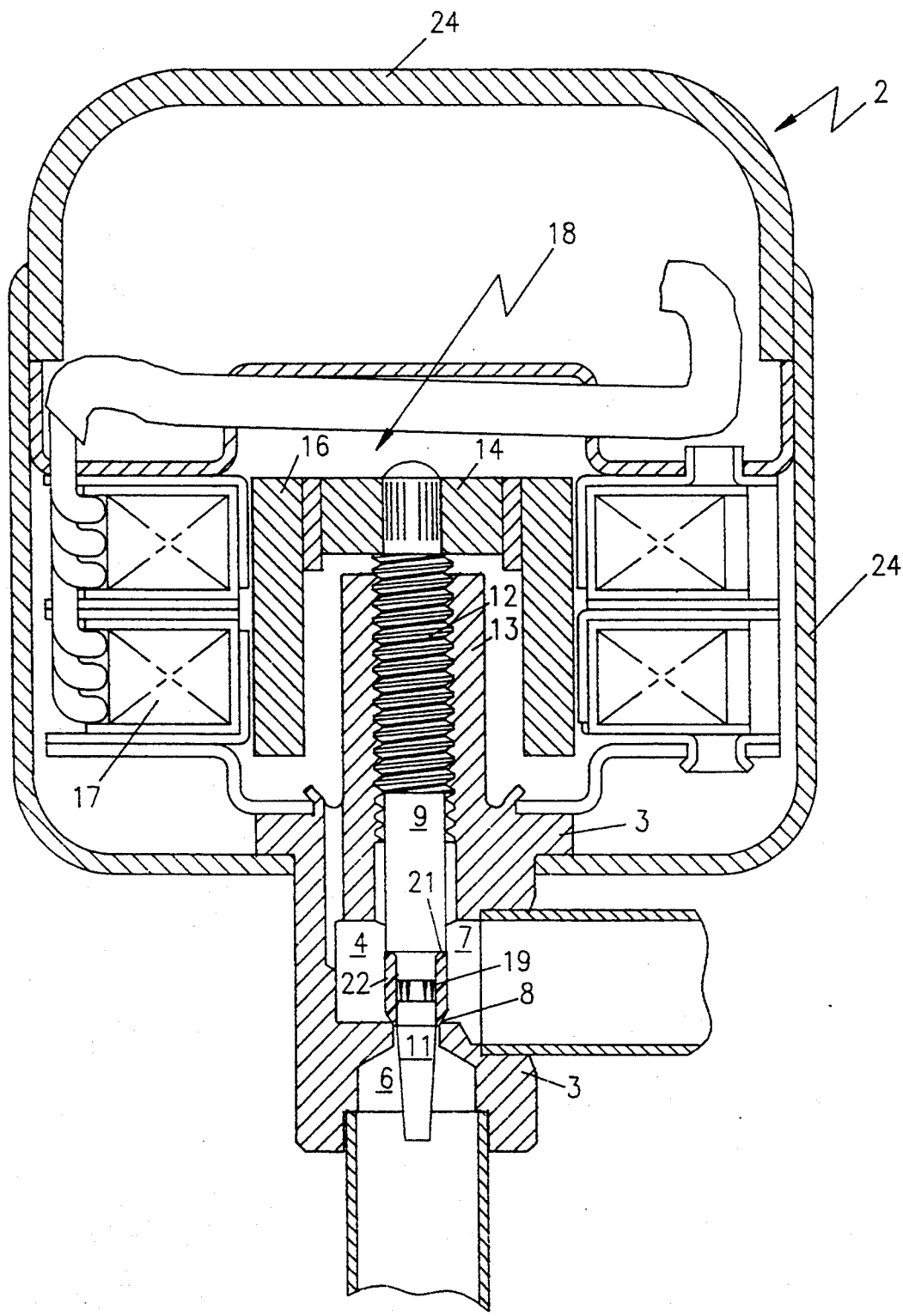
FIG. 1 is a partially broken away, cross-sectional side view of the novel valve assembly structure of the present invention with the valve in closed position.
Figure 2:
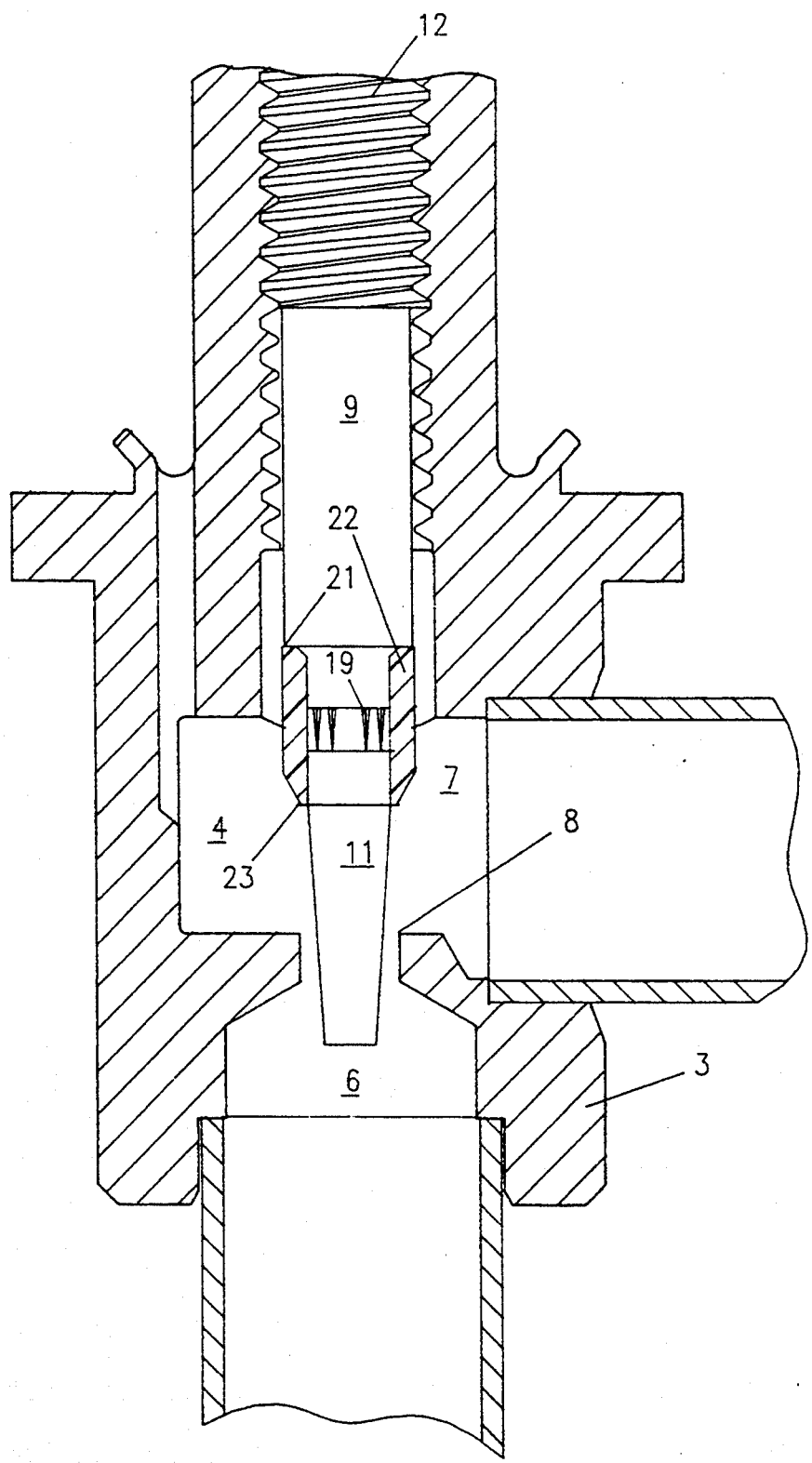
FIG. 2 is an enlarged, partially broken away, cross-sectional view of the valve body of FIG. 1 with the valve in open position.

Referring to FIG. 1 of the drawings, the novel valve assembly structure 2 is disclosed as including a valve body 3 which can be formed from any one of a number of suitable, hard, noncorrosive materials and advantageously is formed as a single machined brass unit, as can be seen in FIG. 2 of the drawings. Valve body 3 includes a flow-through fluid passage 4 extending therein to allow a fluid stream to flow between one end port opening 6 cooperative with passage 4 and the other end port opening 7 cooperative with 4. In the embodiment of the valve body disclosed, the fluid passage 4 is shown as including a right angle turn with the flow axis through ports 6 and 7 respectively being at relative right angles to each other. It, of course, is to be understood that other forms and shapes of valve bodies and fluid passage arrangements also can be utilized which incorporate the inventive valve assembly features disclosed herein and that fluid can flow from ports 6 to 7 or ports 7 to 6.

Figure 3:
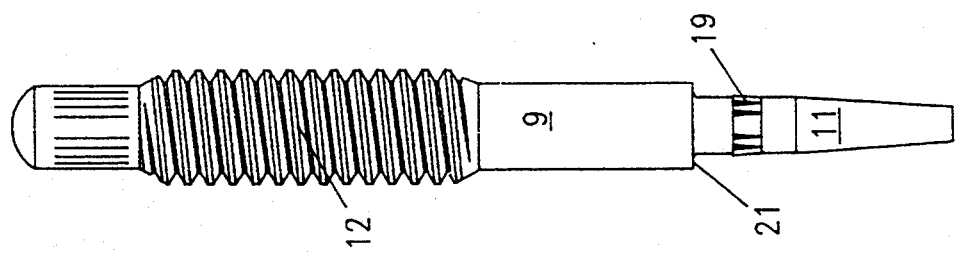
FIG. 3 is an enlarged side view of the valve stem of FIG. 1 without an annular collar mounted thereon.

Referring to the disclosures of FIG. 1 and 2, a portion of valve body 3 that communicates with the fluid passage 4 and end port opening 6 is representively disclosed. In these FIGS. 1 and 2, it can be seen that an annular sealing surface 8 adjacent fluid passage 4 is provided in valve body 3. The annular sealing surface 8 cooperates with end port opening 6, extending in a spaced plane surrounding fluid passage 4. A longitudinally extending, lineally movable valve stem 9 is disposed in valve body 3 with a lower end portion 11 of such moveable valve stem 9 being geometrically sized, configured and aligned to moveably cooperate with annular sealing surface 8 and the port end opening 6 to control passage of fluid in fluid passage 4. The upper end portion 12 of valve stem 9, as can be seen in FIG. 3, is externally threaded, and, as can be seen in FIG. 1, this externally threaded upper end portion 12 threadedly engages with an internally threaded passage provided in vertical extension arm 13 of valve body 3 aligned with and opposite the end port opening 6.

Still referring to FIG. 1 of the drawings, it can be seen that the externally threaded upper end portion 12 of valve stem 9 extends beyond extension arm 13 of valve body 3 to receive and have fastened to the end extremity thereof annular end collar or hub 14. The outer periphery of end collar or hub 14, in turn, is fastened to the inner wall of annular magnetic rotor 16 disposed to rotate within a step wired annular stator 17 of an electric step motor assembly 18. When step motor 18 is energized, rotor 16 is caused to rotate and this, in turn, through hub 14 rotates threaded valve stem 9, which moves lineally along its longitudinal axis due to the threaded engagement with extension arm 13 as aforedescribed. Advantageously, electric step motor 18 has an operating capability of approximately sixty (60) steps per second and causes threaded valve stem 9 to lineal travel approximately one fourth (¼) of an inch from fully open to fully closed valve positions in approximately six (6) seconds of electric motor 18 operation. It is to be understood that power can be supplied to rotor 16 of step motor 18 through a suitable glass to metal fused hermetic terminal assembly (not shown) which passes appropriately through outer assembly housing 24 (FIG. 1). It further is to be understood that the present invention is not to be considered as limited to the specific operating capability as set forth herein, but that other types of stepper ranges could be utilized. In addition other coupling structures could be utilized to connect the valve stem to the motor without departing from the scope of the present invention.

As again can be particularly seen in the disclosure of FIG. 2 and, in accordance with certain of the features of the present invention, the lower end portion 11 of valve stem 9 can be provided with a plurality of longitudinally extending, spaced barb-like protrusions 19 which extend radially outward from the periphery of valve stem 9. In addition valve stem 9 is provided with an annular step 21, thus providing a collar receiving recess, the step 21 and barbs 19 serving to restrain longitudinal and rotational movement respectively of an annular collar 22, which annular collar 22 is press fit into valve stem 9 in the step formed recess of valve stem 9 with one extremity of annular collar 22 abutting the annular step 21 in the valve stem 9 and with the inner wall of annular collar 22 engaging with the spaced barbs 19 on the valve stem.

Advantageously, annular collar 22 can be formed from a suitable low friction, long wearing material, such as an elastomeric material sold under the trademark "RULON". It is to be understood that the polymeric material selected desirably should be wear resistant, should provide a smooth surface with minimal frictional contact, and should be capable of operation over a broad temperature range. In accordance with one feature of the present invention annular collar 22 is of carefully selected thickness and length in accordance with the size of the valve stem with which it engages so as to minimize possible buckling of the collar on the stem with which it engages. In accordance with still another feature of the present invention, the lower peripheral end portion of annular collar 22 advantageously is tapered inwardly at an angle range between approximately fifteen (15) to sixty (60) degrees and preferably aproximately sixty (60) degrees measured from the narrow width annular sealing surface extremity 23 of collar 22 which faces the annular sealing surface 8 of valve body 3. This selected inwardly sloping angle serves to selectively minimize frictional contact between the facing sealing surfaces upon engagement when the valve stem 9 has been moved to "closed" position relative end port opening 6, as can be seen in FIG. 1. It is to be understood that the greater the angle the lesser fluid restriction would occur between spaced port openings 6 and 7 and it further is to be understood that to provide such minimal contact surfaces, it also would be possible to provide a raised and appropriately angled annular sealing surface 8 and to even provide a recess in valve body 3 to receive a separate annular sealing surface ring which could include an inwardly tapered contact surface. It also is to be noted that a cup-shaped housing shell 24 (FIG. 1) is provided to engage with valve body 3 to protect the electric step motor assembly 18.

Figure 4:
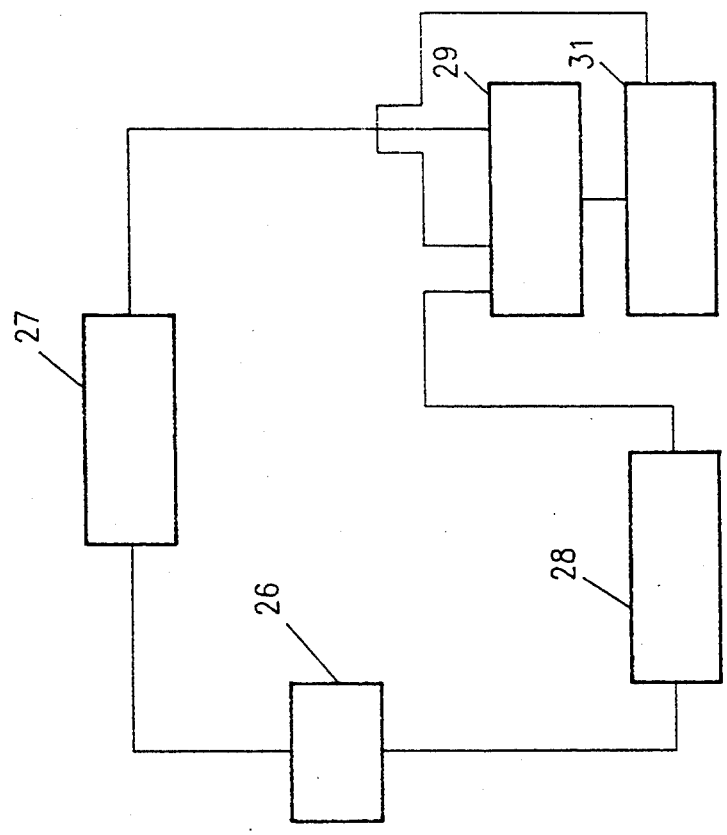
FIG. 4 is a schematic diagram of a heat pump system with the valve assembly structure of the present invention incorporated in the system.

Referring to FIG. 4, a refrigeration system in the form of a heat pump is disclosed which system can incorporate the aforedescribed valve assembly structure in the form of a reversing flow expansion valve 26. The expansion valve 26 can be positioned, as is known in the art, between an indoor refrigerant-to-air-heat exchange coil 27 and an outdoor refrigerant-to-air-heat exchange coil 28 with the two coils 27 and 28, in turn, being connected through a 4-way reversing control valve 29 for compressor 31.

The invention claimed is:

1. In a valve assembly, valve structure for a fluid stream comprising;

a valve body including a flow-through fluid passage extending therein to allow a fluid stream to flow from one end port opening of said passage to the other end port opening of said passage, at least one end port opening having an annular edge sealing surface in said valve body cooperative with said end port opening to extend in a spaced plane surrounding said fluid passage adjacent said end port opening;

a longitudinally extending, lineally movable, valve stem cooperatively mounted in said valve body, said valve stem having one end portion thereof geometrically sized and configured to moveably cooperate with said annular edge sealing surface and said cooperative end port opening in said valve body to extend freely therethrough without contact and control passage of fluid through said end port opening; and, an annular smooth, low friction, long wearing collar member formed from a firm, pressure yielding material surroundingly engaging with the periphery of said valve stem in selected spaced relation from the extremity of said end portion of said valve stem adapted to cooperate with said end port opening to control fluid flow therethrough, said collar member including an annular sealing surface at one end extremity thereof adapted to engage in firm, pressure yielding annular edge faced sealing relation with said annular edge sealing surface in said valve body cooperative with said end port opening upon lineal movement of said valve stem to a preselected control position to be in substantially minimal annular line and edge facing pressure yielding contact so as to effect complete sealing contact therearound with the remainder of said one extremity of said collar member extending freely through said opening without contact along with said one end portion of said valve stem extending therethrough.

2. The valve assembly structure of claim 1, said valve stem one end portion along with said annular collar member being selectively inwardly tapered toward said extremity cooperative with said end port opening at a selected angle with said extremities thereof passing freely without contact through said end port opening into said passage to vary the flow of fluid therearound upon lineal movement of said valve stem.

3. The valve assembly structure of claim 1, the end portion of said valve stem opposite said end portion cooperative with said end port opening having actuating control means cooperative therewith to lineal move said valve stem in controlled incremental movements.

4. The valve assembly structure of claim 3, said actuating control means comprising an electric step motor assembly including a wired stator and a magnetic rotor with said valve stem end portion opposite said end portion cooperative with said end port opening being connected to said magnetic rotor and being externally threaded to engage with an internally threaded passage in said valve body for stepped lineal movement of said valve stem upon stepped rotation of said rotor.

5. The valve assembly structure of claim 1, said annular collar member surroundingly engaging with the periphery of said valve stem being of selected thickness and length to avoid buckling with the lower peripheral end portion thereof being inwardly tapered toward said annular sealing surface at one extremity of said collar to selectively minimize frictional contact between said faced sealing surfaces of said collar and said annular edge sealing surface in said valve body.

6. The valve assembly structure of claim 5, said inwardly tapered collar end portion capable of extending freely through said end port opening without contact being at an angle to said annular edge sealing surface thereof in the range of fifteen to sixty (15 to 60) degrees.

7. The valve assembly structure of claim 6, said inwardly tapered collar end portion advantageously being an approximately sixty (60) degree angle.

8. The valve assembly structure of claim 1, and means cooperative between said valve stem and said collar member to restrain rotational movement of said collar member about said valve stem.

9. The valve assembly structure of claim 1, and means cooperative between said valve stem and said collar member to restrain longitudinal movement of said collar member relative the longitudinal axis of said valve stem.

10. The valve assembly structure of claim 1, said annular collar member being of an elastomer material.

11. The valve assembly structure of claim 10, and a plurality of longitudinal, spaced barb-like protrusions extending radially from said valve stem to engage with the inner wall of said annular elastomer collar member to restrain rotational movement of said collar member about said valve stem.

12. The valve assembly structure of claim 1, said valve stem including an end portion of stepped down cross-section about which said collar member surroundingly engages thus restraining longitudinal upward movement of said collar member relative the longitudinal axis of said valve stem.

13. An electrically activated expansion valve for a refrigeration system comprising;
a valve body having spaced inlet and outlet end port openings with a flow-through fluid passage extending therebetween to allow a fluid stream to flow from said inlet end port opening to said outlet end port opening; said fluid passage adjacent said inlet end port opening having an annular sealing surface in said valve body surrounding said fluid passage adjacent to and spaced from said inlet end port opening and extending in common plane transverse the plane of said inlet end port opening; a longitudinally extending valve stem externally threaded along one end portion thereof to threadedly engage with an internally threaded passage in an extension arm of said valve body opposite said inlet end port opening, said end portion of said valve stem extending beyond said valve body and having a stem surrounding annular collar fastened thereto at the extremity thereof; an electric step motor assembly including a step wired annular stator and an annular magnetic rotor disposed therein and fastened to said stem surroundingly annular collar to rotate said valve stem, said step motor having an operating capability of approximately sixty (60) steps per second with said threaded valve stem traveling approximately one fourth of an inch from fully open to fully closed valve position in approximately six (6) seconds of operation of said motor; the opposite end portion of said valve stem having a plurality of longitudinal, spaced barb-like protrusions extending radially from said valve stem and an annular step to provide a peripheral collar receiving annular recess in said valve stem which serves to restrain longitudinal movement of a collar member relative the longitudinal axis of said valve stem; an elastomer annular collar press fit into said annular collar recess of said valve stem with the inner wall of said elastomer annular collar engaging with longitudinally extending spaced barb-like protrusions on said valve stem periphery to restrain rotational movement of said elastomer collar about said valve stem, said elastomer collar being of selected thickness and length to avoid buckling with the lower peripheral end portion thereof advantageously being inwardly tapered at angle of approximately sixty (60) degrees to a narrow annular collar sealing surface extremity of said collar which faces the annular sealing surface of said valve body to selectively minimize frictional contact between said facing sealing surfaces upon engagement when said valve stem has been moved to closed position relative said end port opening.

* * * * *